United States Patent [19]

Bentell et al.

[11] Patent Number: 4,615,285
[45] Date of Patent: Oct. 7, 1986

[54] METHOD OF DESTROYING HAZARDOUS WASTES

[75] Inventors: Lars Bentell, Falun; Jarl Martensson, Sandviken, both of Sweden

[73] Assignee: SKF Steel Engineering, AB, Hofors, Sweden

[21] Appl. No.: 720,552

[22] Filed: Apr. 5, 1985

[30] Foreign Application Priority Data

Sep. 21, 1984 [SE] Sweden ................. 8404764
Dec. 3, 1984 [SE] Sweden ................. 8406090

[51] Int. Cl.⁴ .............................. F23G 7/00
[52] U.S. Cl. ..................... 110/346; 110/212; 110/230; 110/237; 110/238; 110/345
[58] Field of Search ............... 110/344, 345, 346, 210, 110/211, 212, 215, 216, 229, 230, 235, 237, 238

[56] References Cited

U.S. PATENT DOCUMENTS

| | | | |
|---|---|---|---|
| 3,727,562 | 4/1973 | Bauer ........................... | 110/344 |
| 3,933,989 | 1/1976 | Itohi et al. .................... | 110/346 X |
| 4,017,273 | 4/1977 | Anderson ..................... | 110/346 X |
| 4,100,255 | 7/1978 | Tschantré .................... | 110/346 X |
| 4,347,226 | 8/1982 | Audeh et al. ................ | 110/346 X |
| 4,400,936 | 8/1983 | Evans .......................... | 110/238 X |
| 4,462,318 | 7/1984 | Carbeau et al. ............. | 110/238 |
| 4,479,443 | 10/1984 | Faldt et al. ................. | 110/237 X |
| 4,481,891 | 11/1984 | Takeshita et al. .......... | 110/346 X |
| 4,508,040 | 4/1985 | Santén et al. ............... | 110/345 X |

Primary Examiner—Albert J. Makay
Assistant Examiner—Steven E. Warner
Attorney, Agent, or Firm—Armstrong, Nikaido, Marmelstein & Kubovcik

[57] ABSTRACT

The invention relates to a method of destroying hazardous waste, by means of under-stoichiometric incineration at a temperature of at least 1200° C., the ratio between injected waste material and oxidant being regulated to give a quotient $CO_2/(CO+CO_2)$ of less than 0.1.

9 Claims, 2 Drawing Figures

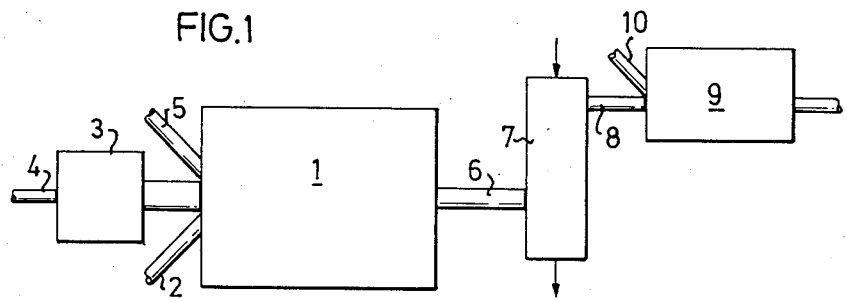
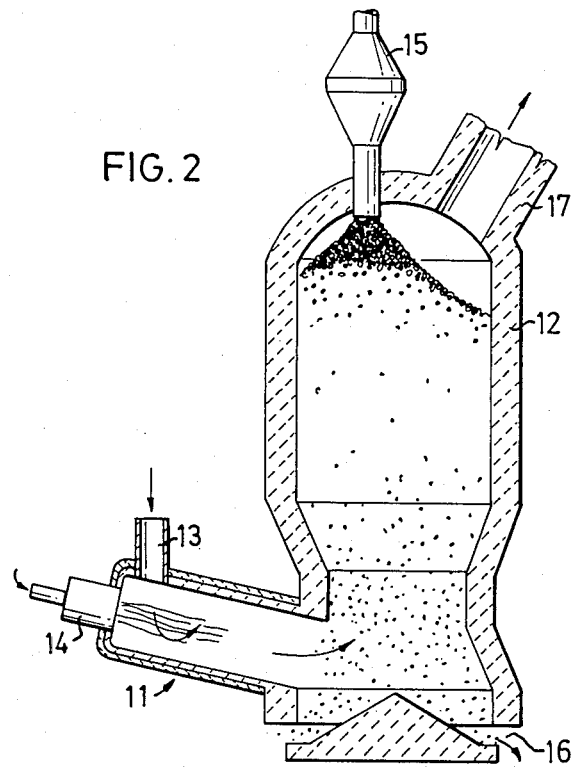

METHOD OF DESTROYING HAZARDOUS WASTES

The present invention relates to a method of destroying solid and/or liquid hazardous wastes, such as material containing chlorinated hydrocarbons and similar toxic compounds which are not degradable in nature.

The accumulation of hazardous wastes constitutes a growing problem throughout the industrialized countries of the world. At present there is no efficient method of destroying these materials and they are therefore dealt with by dumping or by incineration in various types of furnaces.

Examples of non-degradable compounds constituting a serious threat to the environment are PCB, i.e. polychorinated biphenyls. This type of substance is frequently used as dielectric fluid in capacitors and transformers and is also present in waste oil and in insecticides, herbicides and so on.

If these materials are dumped they constitute a threat to the environment since they cannot be rendered innocuous through natural decomposition. Incineration by normal methods is incomplete and at low temperatures new toxic substances are formed, which are sometimes even more toxic than the original waste.

The object of the present invention is to achieve a method of destroying solid and/or liquid hazardous wastes containing substances which are not degradable in nature, which method guarantees the formation of stable, harmless final products.

This is achieved through the method according to the invention comprising subjecting the waste material, primarily in liquid form, to under-stoichiometric incineration at a temperature of at least 1200° C., the ratio between injected waste material and oxidant being regulated to give a quotient $CO_2/(CO+CO_2)$ of less than 0.1. The incineration process is preferably performed at a temperature exceeding ca. 1400° C. The advantage of destruction at high temperature, i.e. preferably above ca. 1400° C., in an atmosphere deficient in oxidant is that the high temperature in the process results in rapid and complete disintegration of the waste material into substances such as $CO$, $CO_2$, $H_2$, $H_2O$, $HCl$ and $Cl_2$.

The re-formation of toxic substances dangerous to the environment which occurs in conventional processes is counteracted by the high temperature, the prevailing oxygen deficiency and the brief duration of stay. The duration of stay is in the order of ca. 0.5–1 sec.

According to the preferred embodiment of the invention, the thermal energy required for the process is supplied by means of gas heated in a plasma generator to ionization temperature. This ensures the requisite high temperature in the process during operating conditions. In the plasma generator electric energy is transformed to thermal energy in a suitable gas, in an electric arc generated in the plasma generator. The gas may consist, for instance, of at least part of the oxidant supplied in the reaction chamber. Furthermore, ultraviolet radiation emitted by the gas at ionization temperature effectively cracks any toxic chlorine compounds remaining in the gas.

The oxidant may consist of a gas containing air, oxygen gas ($O_2$), carbon dioxide ($CO_2$) and/or water vapor ($H_2O$), for instance, which can be supplied to the process entirely or partially through the plasma generator. The reaction chamber consists of a closed, heat-insulated refractory-lined container provided with connections for one or more plasma generators, injection lances for waste material and oxidant, and an outlet for the gas generated.

According to a suitable embodiment of the invention, after the combustion stage with external energy supplied by means of a plasma generator, the gases may also be subjected to a carburizing stage in which they are caused to pass a reactor filled with a solid carbon-carrier such as coke, possibly also including an additive increasing its reactivity, such as an alkali compound. The physical heat of the gas is thus utilized to heat the coke to the temperature of the gas, the carbon in the coke thus being caused to react with oxygen, carbon dioxide and water vapor in the gas, forming carbon monoxide and hydrogen gas and thereby increasing the thermal coefficient of the gas.

The gas may be freed in conventional manner from its content of chlorine compounds by being introduced into a scrubber in which it is cooled and the compounds containing chlorine are removed. The gas freed from chlorine can then be passed to a final combustion chamber or be used directly in an industrial process.

To further reduce the risk of toxic compounds being re-formed and/or new toxic chlorine compounds being formed, according to one embodiment of the invention an additional process step may be carried out in which, after heat-exchanging to a temperature of 350°–700° C., the gases are introduced into a reactor filled with a suitable chlorine acceptor in order to remove chlorine and/or hydrogen chloride and to condense any remaining metal vapor. Slaked or quick lime and/or dolomite are utilized as chorine acceptor.

The invention will now be described with reference to the accompanying drawings, in which FIG. 1 shows a simple diagram of a plant for performing the process according to the invention, and FIG. 2 shows an embodiment of a reaction chamber in combination with a carburizing shaft.

The plant shown in FIG. 1 comprises a reaction chamber 1, lined with refractory material. The waste material to be treated is injected through at least one lance 2. According to the preferred embodiment of the invention, the energy required is supplied by means of a gas heated in at least one plasma generator 3. The gas to be heated is supplied through a pipe 4. Said gas may suitably consist of at least part of the oxidant used in the process. Additional oxidant and/or other reactants is/are supplied through lances 5.

The volume of the reaction chamber is adapted to other process parameters such as gas speed, energy density in the plasma gas, quantity of waste material supplied per time unit, etc., to ensure the necessary duration of stay to accomplish the reactions, i.e. in the order of 0.5–1 sec. In a preferred embodiment, the energy density in the plasma gas is at least 8 $kWh/m^3(N)$.

The gas is transported in a pipe 6 from the reaction chamber to a scrubber 7 where it is cooled and all compounds containing chlorine are removed.

The scrubbed gas is then transported through a pipe 8 to a final combustion chamber 9 in which it is combusted with air supplied through a lance 10.

The gas can of course be used immediately after leaving the scrubber if it has a composition and energy content suitable for an industrial process or the like.

FIG. 2 shows a reaction chamber 11 connected to a carburizing shaft 12. The reaction chamber is provided with an inlet 13 for the material to be destroyed. A gas is supplied to a plasma generator 14 and heated therein to ionization temperature. The gas is supplied to the reaction chamber, emitting heat to the material and simultaneously subjecting it to ultra-violet radiation. The physical heat content of the gas generated here is utilized in the subsequent carburizing shaft 12. This comprises a supply means 15 for coke at the top and an outlet 16 at the bottom for non-combustible material. The gas generated is introduced to the bottom of the reactor and withdrawn through an upper gas outlet 17.

The coke filler in the reactor is heated by the physical heat content of the gas to the temperature of the gas and oxygen, carbon dioxide and water vapor are converted with the carbon in the coke to form carbon monoxide and hydrogen gas. If necessary, sulphur can subsequently be removed from the gas in a conventional manner.

After possibly being cleaned to remove sulphur, the gas is cooled or heat-exchanged to approximately 350°–700° C. and conducted through a suitable acceptor for chlorine and hydrogen chloride in the gas. A suitable chlorine acceptor is slaked or quick lime and/or dolomite. A vertical reactor is preferably used here, filled with the acceptor, suitably of the type used as carburizing shaft.

We claim:

1. A method of destroying hazardous waste material which contains chlorinated hydrocarbons comprising incinerating said waste material at a temperature of at least 1200° C. using under-stoichiometric conditions with the addition of thermal energy supplied by a gas which has been heated in at least one plasma generator, the ratio between waste material and oxidant being regulated to give a product gas in which the quotient $CO_2/(CO+CO_2)$ is less than 0.1 and which contains chlorine and/or hydrogen chloride.

2. A method according to claim 1, wherein the gas in the plasma generator is given an energy density of at least 8 $kWh/m^3(N)$.

3. A method according to claim 1, wherein the oxidant consists of air.

4. A method according to claim 1, wherein after heat-exchanging to a temperature of 350°–700° C., the product gas is introduced into a reactor filled with a chlorine acceptor in order to remove chlorine and/or hydrogen chloride from the gas and to condense any remaining metal vapor.

5. A method according to claim 4, wherein slaked or quick lime and/or dolomite are utilized as chlorine acceptor.

6. A method according to claim 1, wherein the gas is caused to pass a reactor filled with carbon-carrier in solid, lump form product.

7. A method according to claim 6, wherein the reactor filler also includes an additive increasing its reactivity.

8. A method according to claim 6, wherein the physical heat of the product gas is utilized to heat the carbon-carrier to the temperature of the product gas and the carbon is brought to react with oxygen, carbon dioxide and water vapor in the gas, forming CO and $H_2$, to increase the thermal coefficient of the gas.

9. A method according to claim 7, wherein the additive for increasing the reactivity of the reactor filler is an alkali compound.

* * * * *